United States Patent Office 2,797,159
Patented June 25, 1957

2,797,159

METHOD OF PURIFYING OF METALLIC INDIUM

Yurii E. Lebedeff, Metuchen, and William C. Klein, Menlo Park, N. J., assignors to American Smelting and Refining Company, New York, N. Y., a corporation of New Jersey No Drawing. Application January 7, 1955, Serial No. 480,589

2 Claims. (Cl. 75—84)

This invention relates to a process for purifying impure indium metal and, more particularly, to a process for removing lead, tin, bismuth or silver therefrom. The process is especially useful in further purifying indium, which has been purified by the processes heretofore available to the art, to obtain an extremely pure indium product which is suitable for use as a solder in the electronics industry.

Broadly, the process comprehends establishing a molten pool of the indium metal to be purified and converting part but not all of the pool into a chloride slag comprising indium monochloride. The thus formed slag is separated from the molten pool and added to water, thereby precipitating part of the indium values in the slag as metallic indium. The metallic indium precipitate formed in this manner is recovered from the solution and may be melted down and cast into ingots which may be sold as such.

The process is effective in lowering the content of those metal values usually found to be present in indium metal, including metals which are lower as well as metals which are higher than indium in the electromotive series of metals. It has been found that the lower metals tend to concentrate in the unslagged portion of the molten pool and that such metal as is carried into the slag is precipitated with the indium during the precipitation step. It has also been found that removal of these lower metals is effected in the process so long as part but not all of the pool is converted to the slag. The amount of the so-called "heel" of unconverted metal allowed to remain in the slagging step will depend upon the amount of the lower metal in the indium and the desired purity of the product. In general, larger amounts of unconverted heel metal are allowed to remain in order to obtain higher purities in the product. In practicing the process, it is preferred to convert no more than about 75% by weight of the pool to the slag regardless of the desired purity or the amount of impurities it is desired to remove. For economic reasons, it is usually desirable to convert no less than about 20% of the pool to slag.

The impure indium may also contain values of metals which are more active than indium under the slagging conditions. Metals of this type tend to be converted to the slag ahead of the indium. Such metal values which enter the slag, however, are not readily precipitated with the indium in the precipitation step. Nevertheless, due to entrainment or otherwise, they may appear in the indium product. Accordingly, if desired, the first portion of the slag may be separately removed from the molten pool and the slag that is formed thereafter subjected to the precipitation step. Preferably, such first separated portion should comprise no more than about 15% of the weight of the metal originally present in the molten pool. This first slag portion may be formed in one or more steps, using the same or different slag-forming agents, and the slag formed in each step may be separately removed.

Best results are obtained by maintaining the temperature of the molten pool of metal in the range of about 420–850° F., and preferably in the range of 480–650° F., during the slagging step. Also in this temperature range, most of the slags which are encountered are in the molten state and possess a desired degree of fluidity.

In the preferred mode of practicing the invention, the slag which is sent to the precipitation step is a chloride slag. In the preferred procedure, gaseous chlorine is introduced below the surface of the molten metal in the pool until part but not all of the metal is converted to slag, thereby forming a slag comprising indium monochloride, although a slag of this type formed in any other manner or with other chloride slag-forming agents, which desirably are non-metallic agents, may also be employed in the subsequent precipitation step. To date, slags of the other halides have been found to be unduly expensive for use in preparing the slag sent to the precipitation step. In addition, they are not easy, or in some instances as safe, to manipulate in the various process steps. Nevertheless, other halide slags are the equivalent of chloride slag to the extent that they comprise indium monohalide which is in part precipitated as metallic indium upon addition to water.

Water is the most effective and cheapest medium for effecting the precipitation of part of the indium monohalide in the slag as metallic indium. Water in acid solution or other aqueous solution is effective for this purpose. Also, the water used in the precipitation step may contain dissolved metals. However, the metals which are lower than indium in the electromotive series of metals will be precipitated with the indium and will, therefore, limit the purity of the indium product. For this reason, it is preferred to effect the indium precipitation in distilled water. Although they may not be as cheap or as effective as water, other liquids, in which part of the indium monohalide will precipitate as metallic indium, may be substituted for water.

In conducting the process, it is preferred that the molten pool be agitated during the slag-forming step. Agitation is supplied, in the preferred procedure, by introducing gaseous chlorine into the pool desirably as far as possible below the surface of the metal in the pool. The rate of slag formation will depend upon the temperature of the molten pool, the concentration of the slag-forming agent, the nature and time of contact between the reactants, and the efficiency of the agitation. In general, by introducing gaseous chlorine as far as possible below the surface of the metal in a relatively deep pool, 30% of the metal can be converted to slag in upwards of ten hours and 60% within twenty hours.

If desired, the slag may be agitated during the subsequent precipitation step although it is not necessary to do so. The slag may be in a molten or non-molten state, as desired, when added to the water in the latter step. Generally, about two pounds of water for each pound of slag are used to precipitate the indium although any desired ratio may be used. With or without agitation, precipitation of the indium is usually completed within about four hours.

The unconverted heel metal from the slagging step may be further processed in any desired manner to recover indium values therefrom—for example, by recycling through the process. The solution remaining from the precipitation step may also be further processed to recover the indium values therein. For example, the solution may be treated with a galvanic precipitant, such as aluminum or zinc, to precipitate the indium. The thus recovered indium may be sold as such or it may be recycled through the process to produce an extremely pure indium product in which, in most instances, no detectable impurity can be found.

The present process is particularly effective in the removal of bismuth and silver and especially lead and tin from indium. It is also particularly effective in further purifying indium produced by the methods of the prior art which, especially in the case of kettle procedures, commonly contain as much as up to about 0.2% impurities and generally in the range of about 0.05 to 0.2%. A product containing 99.99+% indium can readily be produced by the process. Metal of this type is greatly desired by the electronics industry especially for the production of semi-conductor elements such as germanium transistors.

Another advantage of the process resides in the simplicity and small number of steps involved in obtaining the product. On the other hand, the prior art for the most part involves a relatively large number of steps and great care must be exercised in performing the steps and between steps to avoid contamination. Moreover, it is not necessary to know the amount and nature of the impurity present in the indium in order to obtain the benefits of the invention as the steps involved are effective in lowering the content of metals which are higher as well as those which are lower than indium in the electromotive series of metals.

The invention is further illustrated in the accompanying examples. It should be understood, however, that the examples are given for purposes of illustration and that the invention in its broader aspects is not limited thereto.

*Example I*

26.34 pounds of indium which had been previously purified by kettle procedures and having the following analysis was melted and heated to 600–625° F. in a crucible.

| | Percent |
|---|---|
| Pb | 0.1 |
| Sn | 0.086 |
| Fe | 0.008 |
| Zn | 0.02 |
| Sb | 0.001 |
| Bi | 0.02 |
| Cd | 0.02 |

5.25 pounds of chlorine were introduced into the molten pool over a period of 13.75 hours at a rate of about 0.38 pounds of chlorine per hour, while maintaining the pool in the above temperature range. At the end of that period 21 pounds of molten chloride slag, corresponding to 63.5% or 16.69 pounds of the original metal, were produced. 9.65 pounds of unconverted molten heel metal remained in the crucible. The slag contained 76.0% indium by weight corresponding to an InCl content of 95%.

The 21 pounds of slag in a molten state were poured into 42 pounds (5 gallons) of distilled water. The mixture was allowed to stand for two hours without agitation, during which time metallic indium in sponge form was precipitated. At the end of that period, 13.3 pounds of wet indium sponge were recovered from the solution. 4.7 gallons of solution containing 120 grams of dissolved indium per liter remained after separation of the sponge.

The 13.3 pounds of wet sponge were melted by direct melting in a graphite crucible. The dross which was formed during the melting of the sponge was separated from the metal. 9.13 pounds of metal were obtained, which had the following analysis:

| | Percent |
|---|---|
| Pb | 0.0050 |
| Sn | 0.0027 |
| Fe | 0.0005 |
| Zn | Nil |
| Sb | Nil |
| Bi | Nil |
| Cd | Nil |

*Example II*

The procedure of Example I was repeated, using 8.3 pounds of the indium product therefrom. A total of 1.64 pounds of chlorine were introduced into the pool of molten metal over a period of 5½ hours. At the end of that time, 6.86 pounds of molten chloride slag, corresponding to 67.5% of the original metal, were produced, while 2.7 pounds of molten unconverted metal remained in the crucible. The slag analyzed 76% by weight of indium corresponding to 95.5% InCl.

The slag was poured into 13.8 pounds (1.65 gallons) of distilled water and allowed to stand for two hours without agitation. 6.1 liters of solution containing 120 grams per liter of dissolved indium remained after the separation of the wet indium sponge. Upon melting the sponge, 2.4 pounds of indium metal having the following analysis were obtained:

| | Percent |
|---|---|
| Pb | <0.0005 |
| Sn | <0.0005 |
| Fe | 0.0001 |
| Cd | Nil |

*Example III*

The procedure of Example I was again repeated, using 14 pounds of indium having the following analysis:

| | Percent |
|---|---|
| Pb | 0.06 |
| Sn | 0.4 |
| Al | 0.004 |
| Cu | 0.004 |
| Bi | 0.035 |
| Sb | 0.004 |
| Ag | 0.0002 |

Chlorine was introduced into the molten pool which was maintained at 600° F. until 65% of the metal was converted to slag. The slag was added to distilled water and allowed to stand until no more indium sponge was precipitated. The indium product recovered had the following analysis:

| | Percent |
|---|---|
| Pb | 0.006 |
| Sn | 0.003 |
| Al | <0.001 |
| Cu | 0.0001 |
| Bi | 0.0001 |
| Sb | Nil |
| Ag | Nil |

*Example IV*

26 pounds of indium having the following analysis were treated as described in Example I:

| | Percent |
|---|---|
| Pb | 0.025 |
| Sn | 0.006 |
| Fe | 0.0015 |
| Tl | 0.02 |
| Cu | 0.009 |
| Bi | 0.0005 |

2.38 pounds of chlorine were added to the molten pool over a period of seven hours while maintaining the pool at 560–580° F. to convert 29.7% of the metal to 9.32 pounds of the chloride slag with 18.3 pounds of unconverted heel metal remaining in the pool. Upon adding the slag to distilled water and allowing the mixture to stand until indium precipitation stopped, an indium metal product having the following analysis was obtained:

| | Percent |
|---|---|
| Pb | 0.0002 |
| Sn | Nil |
| Fe | 0.0001 |
| Tl | Nil |
| Cu | 0.0001 |
| Bi | Nil |

Example V 17 pounds of previously purified indium having the following analysis were melted and heated to 520° F. in an open crucible.

| | |
|---|---|
| Pb | 0.01 |
| Sn | 0.02 |
| Fe | 0.005 |
| Al | 0.01 |
| Sb | 0.001 |
| Cu | 0.02 |
| Bi | 0.001 |

A total of 4.67 pounds of NH$_4$Cl were added in incremental portions to the molten metal in the open crucible over a period of ten hours, allowing sufficient time between the added increments for reaction to take place and for foaming to subside. During this period the molten metal was agitated and maintained at a temperature of about 520° F. At the end of that period, 13 pounds of molten chloride slag, corresponding to 58.8%, or 10 pounds, of the original metal were produced. 7 pounds of unconverted molten heel metal remained. The slag contained 75% indium corresponding to an InCl content of about 95%.

The 13 pounds of slag in a molten condition were poured into 26 pounds of distilled water and allowed to remain for two hours. At the end of that period, 9.3 pounds of wet indium sponge were recovered from the solution, leaving 2.9 gallons of residual solution remaining which contained 121 grams per liter of dissolved indium.

The wet sponge was melted directly in a graphite crucible. After removal of the dross, 5.9 pounds of indium were recovered having the following analysis:

| | |
|---|---|
| Pb | 0.006 |
| Sn | Nil |
| Fe | 0.0005 |
| Al | 0.001 |
| Sb | Nil |
| Cu | Nil |
| Bi | Nil |

Example VI 10 pounds of indium containing 0.005% Pb and 0.004% Sn were melted in an open crucible. 30 grams of gaseous anhydrous HCl were slowly introduced into the pool over a period of 3½ hours while maintaining the pool at a temperature of about 450° F. to produce 240 grams of slag. The slag was added to 480 grams of distilled water and allowed to remain for two hours. The wet sponge recovered from the solution was melted under a concentrated solution of KOH and 90 grams of indium metal having the following lead and tin content were obtained:

| | |
|---|---|
| Pb | 0.0001 |
| Sn | Nil |

What is claimed is:

1. A process for further purifying refined metallic indium having therein a metal impurity selected from the group consisting of lead, tin, bismuth, silver and mixtures thereof which comprises establishing a molten pool of said indium, introducing a non-metallic chloridizing agent into said molten pool in amount sufficient to convert about 20–75% by weight of said pool to a chloride slag thereby forming a slag composed at least of about 95% indium monochloride by weight and concentrating said impurity in the unslagged portion of said pool, separating the slag from the unslagged metal, adding said slag to water which is free of said impurity thereby precipitating part of the indium values in the slag as metallic indium, and recovering the thus precipitated indium from the solution.

2. A process according to claim 1 in which said refined indium to be further purified contains up to about 0.2% of said impurity, said chloridizing agent is chlorine, said water is distilled water, and the indium product from the process contains more than 99.99% indium.

References Cited in the file of this patent

UNITED STATES PATENTS

| 1,907,481 | Betterton | May 9, 1933 |
| 2,433,770 | Lebedeff | Dec. 30, 1947 |
| 2,447,672 | Smith | Aug. 24, 1948 |

OTHER REFERENCES

Latimer: "Oxidation Potentials," New York: Prentice-Hall, 1938, pp. 149, 150.

Powell: "Minor Metals," Metals Industry, June 15, 1945, p. 376.